United States Patent [19]

Burnham

[11] 4,413,952
[45] * Nov. 8, 1983

[54] SMALL TEMPERATURE DIFFERENTIAL HEAT-POWERED COMPRESSOR

[75] Inventor: Francis L. Burnham, Orangeburg, S.C.

[73] Assignee: Orangeburg Technologies, Inc., Orangeburg, S.C.

[ * ] Notice: The portion of the term of this patent subsequent to Aug. 31, 1999 has been disclaimed.

[21] Appl. No.: 398,564

[22] Filed: Jul. 15, 1982

Related U.S. Application Data

[63] Continuation of Ser. No. 242,242, Mar. 10, 1981, Pat. No. 4,372,114.

[51] Int. Cl.³ .............................................. F04B 25/00
[52] U.S. Cl. .................................... 417/253; 417/379; 417/394
[58] Field of Search ............... 417/244, 253, 379, 381, 417/383, 384, 46; 137/512.1; 417/394, 52, 207–209

[56] References Cited

U.S. PATENT DOCUMENTS

| | | | |
|---|---|---|---|
| 3,586,461 | 6/1971 | Erlandson | 417/383 X |
| 4,150,923 | 4/1979 | Wardman | 417/379 |
| 4,177,019 | 12/1979 | Chadwick | 417/379 |
| 4,281,969 | 8/1981 | Doub | 417/52 |
| 4,347,045 | 8/1982 | Burnham | 417/379 X |

Primary Examiner—Edward K. Look
Attorney, Agent, or Firm—Larry Harold Kline

[57] ABSTRACT

A pump system is disclosed for pumping a first fluid from a source to a storage facility comprising a multiple-stage small temperature differential heat-powered pump, a second fluid heater operable to heat a second fluid to a fixed hot temperature, and a third fluid cooler operable to cool a third fluid to a fixed cold temperature, wherein hot fluids and cold fluids are diverted into the multiple-stage small temperature differential heat-powered pump.

7 Claims, 20 Drawing Figures

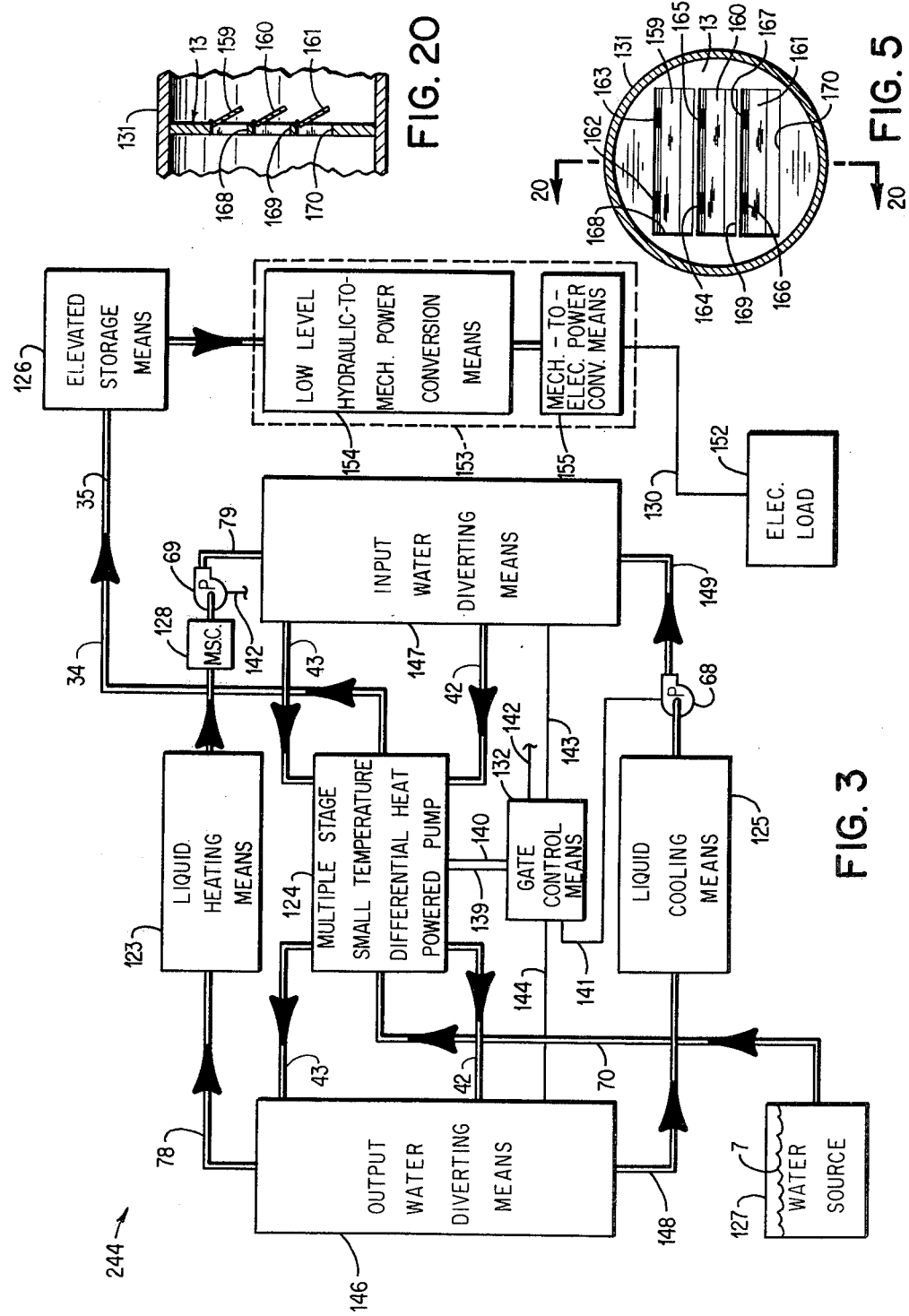

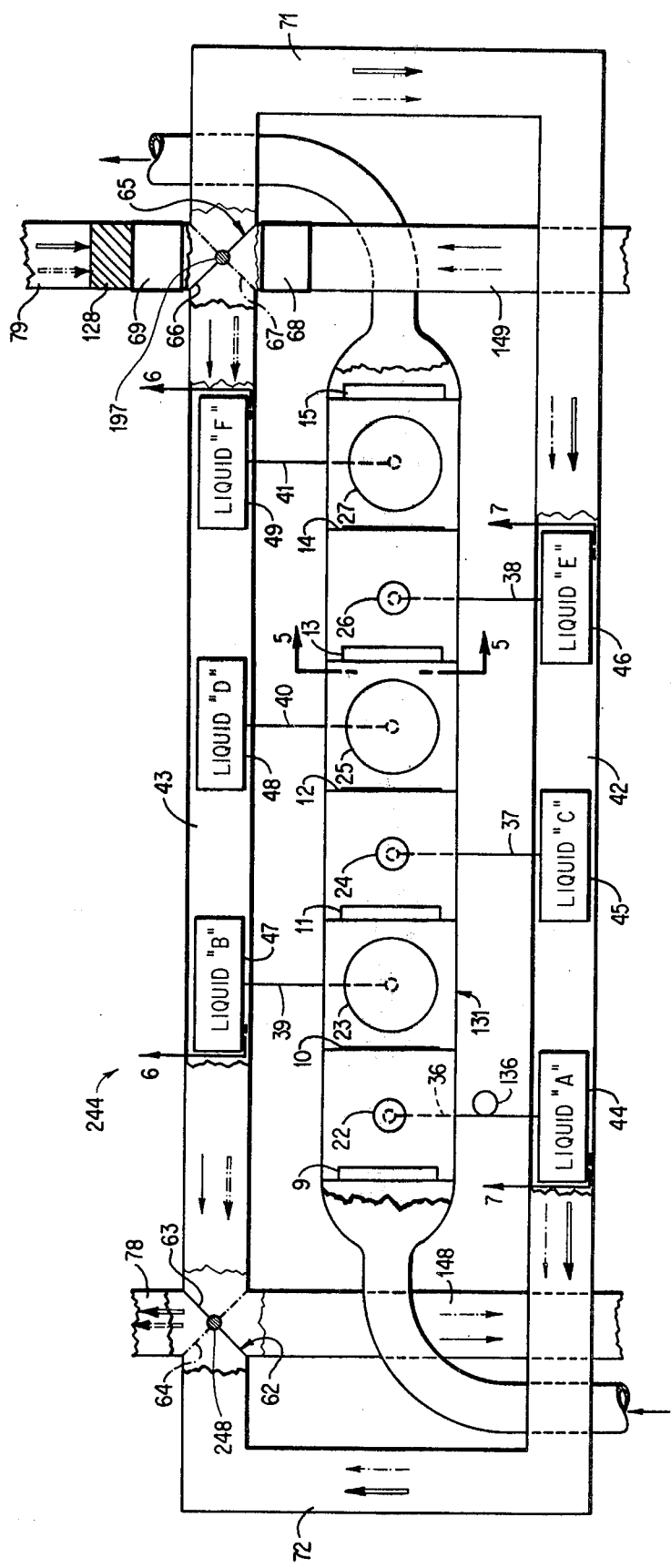

SMALL TEMPERATURE DIFFERENTIAL HEAT-POWERED COMPRESSOR

This application is a continuation, of application Ser. No. 242,242, filed Mar. 10, 1981 now U.S. Pat. No. 4,372,114.

This invention relates to a heat-powered pump and more particularly to a multiple-stage small temperature differential heat-powered pump and a generating system utilizing a plurality of multiple-stage small temperature differential heat-powered pumps.

Previous inventions have utilized a flexible diaphragm as the pumping element with a volatile liquid as a working fluid. The prior art is limited in the pressure and volume of fluid that can be pumped when a vaporizable liquid is varied within set temperature limits. The use of a single vaporizable liquid in heat-powered hydraulic pumps operating between fixed temperatures limits the output pressure capability to an extent that such pumps are relegated to applications where low pressure and pumping capacities are acceptable. Many desired applications require higher pressure and higher flow rates, such as high-capacity irrigation systems, pumping of water from a lower level to a higher level reservoir for municipal-type water systems, and the powering of a large hydraulic turbine electric generator combination for the inexpensive conversion of solar energy into electric power. In localities lacking elevated water storage facilities or when electric power is needed only during daylight hours, a generating system, as disclosed herein, might be preferable utilizing a plurality of multiple-stage small temperature differential heat-powered pumps. The present invention comprises a multiple-stage small temperature differential heat-powered pump which has the capability of a high output pressure when operating between fixed temperatures.

An object of the present invention is to provide a multiple-stage small temperature differential heat-powered pump operable to produce high output pressures utilizing fixed temperatures.

Another object of the present invention is to provide a generating system utilizing a plurality of multiple-stage small temperature differential heat-powered pumps.

A further object of the present invention is to place a plurality of containers holding a plurality of liquids into two troughs which alternately hold hot and cold water in order to alternately vary the pressure of the plurality of liquids to the vapor pressure for a fixed cold temperature and the vapor pressure for a fixed hot temperature.

Still another object of the present invention is to provide a multiple-stage small temperature differential heat-powered pump wherein each stage is separated by one of a plurality of check valves.

A further object of the present invention is to provide a multiple-stage small temperature differential heat-powered pump wherein each stage has a pressure chamber including a flexible member containing the vapor of one of a plurality of liquids and wherein the liquid in the flexible member in one stage is being subjected to a hot temperature while the liquid in the flexible member in the next stage is subjected to a cold temperature with the temperature in each flexible member alternating as the pumping operates.

Another object of the present invention is to provide a multiple-stage small temperature differential heat-powered pump with liquid heating means and liquid cooling means which enter an input water diverting means wherein hot water and cold water are alternately diverted into a plurality of troughs within which are containers holding a plurality of vaporizable liquids.

Still another object of the present invention is to provide a generator utilizing a plurality of multiple-stage small temperature differential heat-powered pumps utilizing liquid heating means and liquid cooling means to provide hot and cold water to an input water diverting means which diverts hot and cold water alternately into a plurality of troughs within which are a plurality of containers holding a plurality of vaporizable liquids.

A further object of the present invention is to provide a multiple-stage small temperature differential heat-powered pump and a generating system utilizing a plurality of multiple-stage small temperature differential heat-powered pumps which can utilize solar energy in liquid heating means to provide for commercial solar power production.

These and other objects and features of the invention will be apparent from the following description and appended claims.

Briefly, the specification discloses a pump system for pumping a first liquid from a source to a storage facility and a generating system for converting flow of a pressurized first liquid to electrical power. The pump system comprises a multiple-stage small temperature differential heat-powered pump. A second liquid heating means is operable to heat a second liquid to a fixed hot temperature. The hot liquid is diverted into the multiple-stage small temperature differential heat-powered pump. A third liquid cooling means is operable to cool a third liquid to a fixed cold temperature where it becomes a cold liquid. The cold liquid is divertable into the multiple-stage small temperature differential heat-powered pump. The generating system comprises a plurality of multiple-stage small temperature differential heat-powered pumps utilized along with the second liquid heating means operable to heat a second liquid to a fixed hot temperature where it becomes a hot liquid and a third liquid cooling means operable to cool a third liquid to a fixed cold temperature where it becomes a cold liquid. The hot liquid and cold liquid are divertable into a plurality of multiple-stage small temperature differential heat-powered pumps. A hydraulic-to-mechanical power conversion means is operative to convert the flow of the pressurized first liquid to mechanical power. The input of the hydraulic-to-mechanical power conversion means is connected to the output of the plurality of the multiple-stage small temperature differential heat-powered pumps. The output of the hydraulic-to-mechanical power conversion means is connected to the input of the plurality of multiple-stage small temperature differential heat-powered pumps. A mechanical-to-electrical power conversion means is connected to the hydraulic-to-mechanical power conversion means and is operative to produce electrical power. The hot liquid may be hot water and the cold liquid may be cold water. The second liquid heating means may utilize solar energy to heat the second liquid to a fixed hot temperature. The hot liquid and the cold liquid are pumped into an input water diverting means which controls the flow of the hot liquid and the cold liquid into the multiple-stage small temperature differential heat-powered pump. The input water diverting means diverts the hot liquid and the cold liquid alternately into each one of a plurality of troughs within the multiple-stage small temperature differential heat-powered pump. Each of the plurality of multiple-stage small temperature differential heat-powered pumps comprises a plurality of pumping stages and a plurality of check valves. One of the plurality of check valves is located on the input and output of each multiple-stage small temperature differential heat-powered pump. A check valve is also located between each of the plurality of pumping stages. Each of the plurality of pumping stages comprises a pressure chamber operable to hold the first liquid.

A flexible member within the pressure chamber operates, when expanded, to exert pressure against the first liquid and to force the first liquid from the pressure chamber through one of the plurality of check valves between the pressure chamber and the next pressure chamber of the next subsequent pumping stage of the plurality of pumping stages or the output, if the pressure chamber is within the last of the plurality of pumping stages, when the pressure within the pressure chamber exceeds the next pressure in the next pressure chamber or the output. The flexible member is connected to a container which is one of a plurality of containers. Each of the plurality of containers holds one of the plurality of vaporizable liquids. When the container is subjected to hot liquid, the vaporizable liquid vaporizes causing the flexible member to expand. When the container is subjected to cold liquid, the vaporizable liquid condenses causing the flexible member to contract.

Each one of the plurality of vaporizable liquids which vaporizes into the flexible member has a higher vapor pressure, when heated to the fixed hot temperature, than the cold vapor pressure of the next one of the plurality of vaporizable liquids which vaporizes into the next flexible member within the pressure chambers or to the output, if the flexible member is within the last of the plurality of pumping stages.

Each one of the plurality of containers is secured within one of the plurality of troughs. Each container is subjected alternately to the hot liquid and then the cold liquid. Each of the plurality of pumping stages has a flexible member connected to one of the plurality of containers. Each one of the plurality of containers is secured within one of the plurality of troughs and is subjected alternately to hot liquid and cold liquid.

The next subsequent pumping stage of the plurality of pumping stages has a next flexible member connected to another one of the plurality of containers which is secured within another one of the plurality of troughs and is also subjected alternately to the cold liquid and the hot liquid at times opposite to the first of the plurality of containers. When one of the plurality of containers is subjected to the hot liquid, the another one of the plurality of containers is subjected to the cold liquid and vice versa. In the plurality of pumping stages, when the first stage has a first flexible member connected to a first container subject to the hot liquid, the second stage would have a second flexible member connected to a second container subjected to the cold liquid. Each odd-numbered container is subjected to the opposite condition of each even-numbered container. When the first stage has a first flexible member connected to the first container subjected to cold liquid, the second stage has a second flexible member connected to the second container subjected to the hot liquid. Each odd-numbered container is subjected to the opposite condition of each even-numbered container within the plurality of containers connected to the plurality of pumping stages.

The first vaporizable liquid in the first container, which is connected to the first flexible member in the first pumping stage, has a cold vapor pressure lower than the pressure of the first liquid in the source. In the generating system, the first vaporizable liquid in the first container, which is connected to the first flexible member in the first pumping stage, has a cold vapor pressure lower than the pressure of the output of the hydraulic-to-mechanical power conversion means.

The second vaporizable liquid in the second container, which is connected to the second flexible member in the second pumping stage, has a cold vapor pressure lower than the hot vapor pressure of the first vaporizable liquid in the first container. When the first container is subjected to the hot liquid and when the second container is subjected to the cold liquid, the pressure within the first pumping stage is greater than the pressure within the second pumping stage and the first liquid will move through the one of the plurality of check valves between the first pumping stage and the second pumping stage into the second pumping stage.

The plurality of troughs may comprise a first trough and a second trough. The output water diverting means is operable to control the flow of the hot liquid from the multiple-stage small temperature differential heat-powered pump back to the second liquid heating means and to control the flow of the cold liquid from the multiple-stage small temperature differential heat-powered pump back to the third liquid cooling means. The input water diverting means comprises an inlet gate with a first inlet gate position and a second inlet gate position. When the inlet gate is in the first inlet gate position, the hot liquid is diverted into the first trough and the cold liquid is diverted into the second trough. When the inlet gate is in the second inlet gate position, the hot liquid is diverted into the second trough and the cold liquid is diverted into the first trough. The output water diverting means comprises an outlet gate with a first outlet gate position and a second outlet gate position. When the outlet gate is in the first outlet gate position, the hot liquid is diverted from the first trough back to the second liquid heating means and the cold liquid is diverted from the second trough back to the third liquid cooling means. When the outlet gate is in the second outlet gate position, the hot liquid is diverted from the second trough back to the second liquid heating means and the cold liquid is diverted from the first trough back to the third liquid cooling means. A gate control means is connected to one of the plurality of multiple-stage small temperature differential heat-powered pumps and operates to change the inlet gates and the outlet gates simultaneously from one gate position to another. Each of the plurality of check valves may comprise a plurality of hinged members. The generating system may have two multiple-stage small temperature differential heat-powered pumps. In the even-numbered pumping stages for each of the two multiple-stage small temperature differential heat-powered pumps, the even-numbered flexible members within the even-numbered pressure chambers are connected to the even-numbered containers which are located in the same trough with the odd-numbered containers which are connected to the odd-numbered flexible members within the odd-numbered pressure chambers of the other multiple-stage small temperature differential heat-powered pump. The container for the first vaporizable liquid is connected to the first flexible member and the container for the third vaporizable liquid is connected to the third flexible member in the first multiple-stage small temperature differential heat-powered pump and are secured in the first trough along with the container for the second vaporizable liquid connected to the second flexible member in the second multiple-stage small temperature differential heat-powered pump. The container for the first vaporizable liquid connected to the first flexible member and the container for the third vaporizable liquid connected to the third flexible member in the second multiple-stage small temperature differential heat-powered pump are secured in the second trough along with the container for the second vaporizable liquid connected to the second flexible member in the first multiple-stage small temperature differential heat-powered pump.

In the generating system, the first vaporizable liquid in the first multiple-stage small temperature differential heat-powered pump may be identical to the first vaporizable liquid in the second multiple-stage small temperature differential heat-powered pump. Each numbered vaporizable liquid connected to the same numbered stage in each of the two multiple-stage small temperature differential heat-powered pumps is identical for each similar stage of the two multiple-stage small temperature differential heat-powered pumps. Each succeeding stage, of course, has a different vaporizable liquid with different pressure properties for the fixed hot and cold temperatures.

The plurality of multiple-stage small temperature differential heat-powered pumps may be two or a greater plurality, if desired, and if sufficient liquid heating means and liquid cooling means are available to support the desired plurality of multiple-stage small temperature differential heat-powered pumps.

The containers utilized within each stage may be individually designed to perform as an appropriate heat exchanger to obtain the desired degree of vaporization or condensation of the liquid enclosed within the heat exchanger. The plurality of stages of each multiple-stage small temperature differential heat-powered pump may be considered by terminology usage as being a first stage followed by a second stage, followed by a third stage, followed by a fourth stage, followed by a fifth stage, followed by a sixth stage, etc. The first, third, and fifth stages would be considered odd-numbered stages. The second, fourth, and sixth stages would be considered even-numbered stages.

The liquid heated by the liquid heating means 123 may be water or any other desired liquid. The liquid cooled by the liquid cooling means 125 may be water or any other desired liquid.

The invention will be more fully understood from the following detailed description and appended claims when taken with the drawings in which:

FIG. 3 is a schematic representation of heat-powered pump system 244.

FIG. 4 is a top view of heat-powered pump system 244.

FIG. 5 is a sectional view through Section 5—5 of check valve assembly 13 in FIG. 4.

FIG. 20 is a sectional view of check valve 13 at Section 20—20 of FIG. 5.

Figure 1:
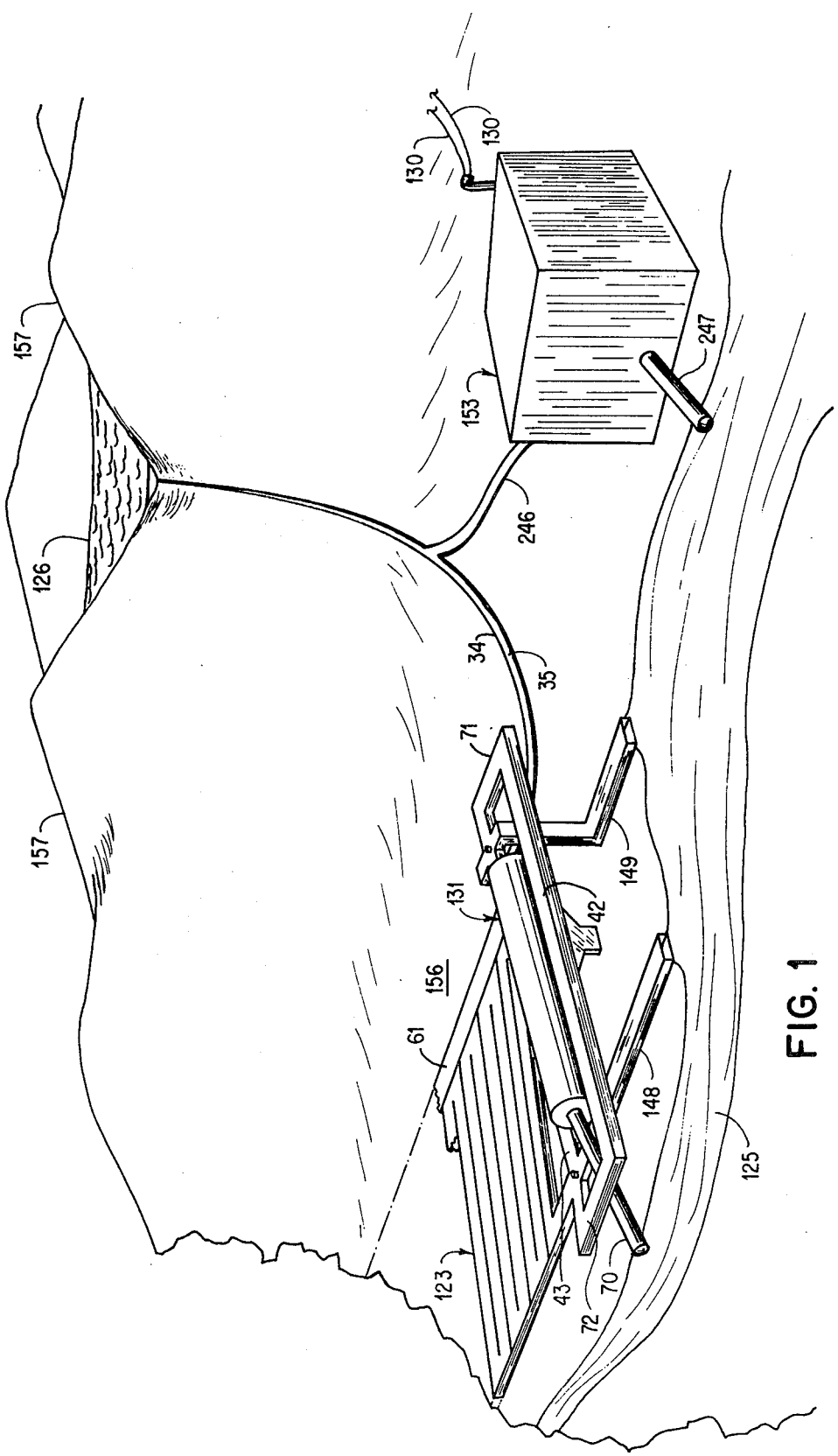
FIG. 1 is a perspective view of a solar-powered multi-stage pumping system used for filling a reservoir 126 and generating electricity.

Referring now to the drawings, FIG. 1 is a perspective view of a solar-powered multi-stage pumping system used for filling a reservoir 126 and generating electricity. The reservoir 126 is shown located in high or mountainous land 157. The multiple-stage small temperature differential heat-powered pump 124 is shown located in flat land 156. Liquid heating means 123 is utilized to heat a liquid. The liquid heating means 123 shown is a trough-type solar collector utilizing trough 61. Liquid cooling means 125, for this illustration, is the river 125 which is also the source of the water taken in through inlet pipe 70. Connecting trough 149 is the inlet trough for the cold water for the system. Connecting trough 148 is the outlet connecting trough carrying the cold water from the system back to the river 125. Pipe 34 carries the pressurized water 35 up to the elevated storage means or reservoir 126. Water supply pipe 246 supplies pressurized water to generating station 153. Discharge pipe 247 discharges water from generating station 153 back into the cold water supply, which is the river 125. Extending from generating station 153 are electrical wires 130 carrying electricity to an electrical load 152 (not shown). FIG. 1 is merely illustrative of one prospective possibility for utilization of the heat-powered pumping system 244 of the present invention.

Figure 2:
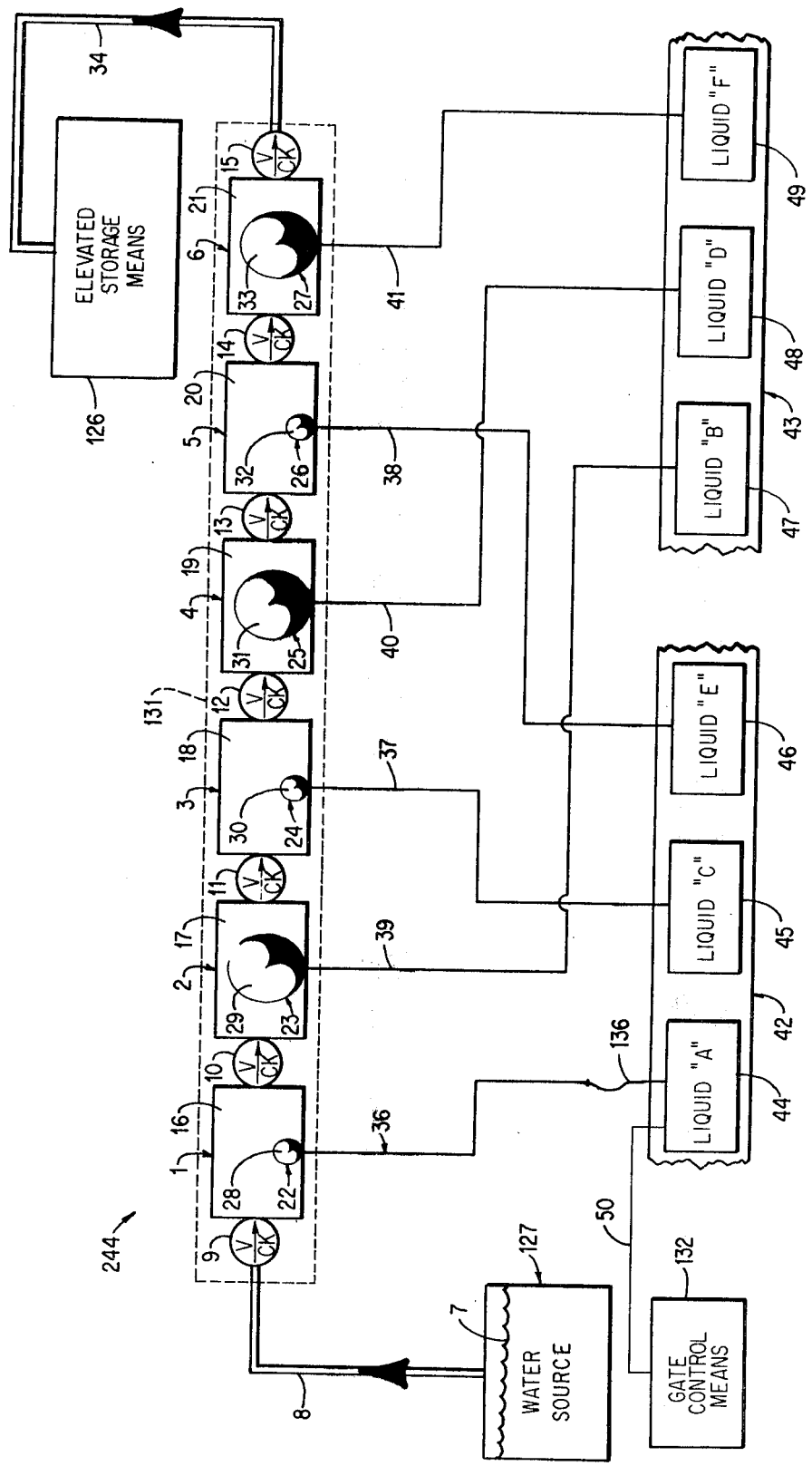
FIG. 2 is a schematic display of the pumping sequence for heat-powered pump system 244.

FIG. 2 is a schematic display of the pumping sequence for heat-powered pump system 244. Heat-powered pump system 244 comprises pumping stages 1, 2, 3, 4, 5, and 6. Pumping stage 1 comprises a flexible member 22 within a pressure chamber 16. Flexible member 22 contains a vapor 28. Pumping stage 2 comprises a flexible member 23 within pressure chamber 17. Flexible member 23 contains vapor 29. Pumping stage 3 comprises a flexible member 24 within a pressure chamber 18. Flexible member 24 contains a vapor 30. Pumping stage 4 comprises a flexible member 25 within a pressure chamber 19. Flexible member 25 contains a vapor 31. Pumping stage 5 comprises a flexible member 26 within a pressure chamber 20. Flexible member 26 contains a vapor 32. Pumping stage 6 comprises a flexible member 27 within a pressure chamber 21. Flexible member 27 contains a vapor 33.

In heat-powered pump system 244, water 7 is being pumped from a water source 127 to an elevated storage means 126. The water 7 is pumped through connecting means or pipe 8 and through check valve 9 into pumping stage 1. The water 7 then passes through check valve 10 into pumping stage 2. The water 7 then passes through check valve 11 into pumping stage 3. The water 7 then passes through check valve 12 into pumping stage 4. The water 7 then passes through check valve 13 into pumping stage 5. The water 7 then passes through check valve 14 into pumping stage 6. The water 7 then passes through check valve 15 and through connecting means or pipe 34 to the elevated storage means 126. The water within pipe 34 becomes pressurized water 35.

Flexible member 22 contains vapor 28 from liquid "A" in container 44. Flexible member 23 contains vapor 29 from liquid "B" in container 47. Flexible member 24 contains vapor 30 from liquid "C" in container 45. Flexible member 25 contains vapor 31 from liquid "D" in container 48. Flexible member 26 contains vapor 32 from liquid "E" in container 46. Flexible member 27 contains vapor 33 from liquid "F" in container 49.

Pipe 36 with flexible section 136 connects container 44 for liquid "A" to flexible member 22. Pipe 37 connects container 45 for liquid "D" to flexible member 24. Pipe 38 connects container 46 for liquid "E" to flexible member 26. Pipe 39 connects container 47 for liquid "B" to flexible member 23. Pipe 40 connects container 48 for liquid "D" to flexible member 25. Pipe 41 connects container 49 for liquid "F" to flexible member 27.

Containers 44, 45, snd 46 are in a first trough 42. Containes 47, 48, and 49 are in a second trough 43. Gate control means 132 is connected by cable 50 to container 44. Pumping stages 1, 2, 3, 4, 5, and 6 are enclosed within pump body 131.

FIG. 3 is a schematic representation of heat-powered pump system 244. Water 7 is taken from water source 127 through inlet pipe 70 which is equivalent to the connecting means or pipe 8 and into the multi-stage small temperature differential heat-powered pump 124. The pressurized water 35 flows from the multiple-stage small temperature differential heat-powered pump 124 through pipe 34 to elevated storage means 126. The other water flow shown in FIG. 3 is the flow of water to operate the multiple-stage small temperature differential heat-powered pump 124.

Liquid heating means 123 heats a liquid. The hot liquid flows through a hot water pump 60 with a motor speed control 128 and through connecting trough 79 to input water diverting means 147. The input water diverting means 147 diverts the hot liquid into the appropriate trough, either first trough 42 or second trough 43 which extend within the multiple-stage small temperature differential heat-powered pump 124. The heated liquid will be utilized by the multiple-stage small temperature differential heat-powered pump 124 and will enter the output water diverting means 146. The previously hot liquid will then be returned by connecting trough 78 to the liquid heating means 123.

Liquid cooling means 125 cools a liquid. The cold liquid flows through the cold water pump 68 and through connecting trough 149 to input water diverting means 147. The input water diverting means 147 diverts the cold liquid into the appropriate trough, either first trough 42 or second trough 43 which extend within the multiple-stage small temperature differential heat-powered pump 124. The cold liquid will be utilized by the multiple-stage small temperature differential heat-powered pump 124 and will enter the output water diverting means 146. The previously cold liquid will then be returned by connecting trough 148 to the liquid cooling means 125. The expandable members discussed herein may be flexible bladders, diaphragms, bellows, or similar flexible members in which vaporized liquids may exert pressure in order to expand the area inside the flexible members so that pressure is exerted against the first liquid within the container within which the flexible members reside.

The gate control means 132 is connected to the multiple-stage small temperature differential heat-powered pump 124 by wire 139 and wire 140. The gate control means 132 is connected to hot water pump 69 by wire 142. The gate control means 132 is connected to cold water pump 68 by wire 141. The gate control means 132 is connected to input water diverting means 147 by wire 143. The gate control means 132 is connected to output water diverting means 146 by wire 144.

The pressurized water 35 in elevated storage means 126 may be utilized by generating station 153 to handle electrical load 152. The generating station 153 is connected to the electrical load 152 by wire 130. The generating station 153 may comprise a low level hydraulic-to-mechanical power conversion means 154 and a mechanical-to-electrical power conversion means 155.

FIG. 4 is a top view of heat-powered pump system 244. The input water diverting means 147 comprises inlet gate 65. The output water diverting means 146 comprises outlet gate 62. The inlet gate 65 can be placed into basically two positions, inlet gate position 66 and inlet gate position 67. The outlet gate 62 can be placed into basically two positions, outlet gate position 63 and outlet gate position 64. When inlet gate 65 is in position 66, outlet gate 62 is in position 63. When inlet gate 65 is in position 67, outlet gate 62 is in position 64.

To help explain the water path flow in FIG. 4, arrow 171 is utilized to indicate the hot water path with outlet gate 62 in position 63 and inlet gate 65 in position 66. Arrow 172 indicates the cold water path with outlet gate 62 in position 63 and inlet gate 65 in position 66. Arrow 173 is utilized to indicate the hot water path with outlet gate 62 in position 64 and inlet gate 65 in position 67. Arrow 174 is utilized to indicate the cold water path with outlet gate 62 in position 64 and inlet gate 65 in position 67.

With inlet gate 65 in position 66 and outlet gate 62 in position 63, the hot water will flow through connecting trough 79 past motor speed control 128 and hot water pump 69, and through inlet gate 65 in position 66 through trough section 71, and into first trough 42 within which are containers 44, 45, and 46. The hot water will then flow through trough section 72 into outlet gate 62 in position 63 and then into connecting trough 78, which will return the hot water to liquid heating means 123. The cold water will enter from liquid cooling means 125 through connecting trough 149, past cold water pump 68, and into inlet gate 65 in position 66. The cold water will be diverted into second trough 43 within which are containers 47, 48, and 49. The cold water will then enter outlet gate 62 in position 63 and is diverted to connecting trough 148 to be returned to liquid cooling means 125. When the hot water is in first trough 42, the cold water is in second trough 43.

With inlet gate 65 in position 67 and outlet gate 62 in position 64, the hot water will flow through connecting trough 79, past motor speed control 128 and hot water pump 69 and through inlet gate 65 in position 67, and then into second trough 43 within which are containers 47, 48, and 49. The hot water will then flow into outlet gate 62 in position 64, and then into connecting trough 78 which will return the hot water to liquid heating means 123. The cold water will enter from liquid cooling means 125 through connecting trough 149, past cold water pump 68, and into inlet gate 65 in position 67. The cold water will be diverted into trough section 71 and then into first trough 42, within which are containers 44, 45, and 46. The cold water then passes into trough section 72 and then enters outlet gate 62 in position 64 and is diverted to connecting trough 148 to be returned to liquid cooling means 125. When the cold water is in first trough 42, the hot water is in second trough 43.

FIG. 5 is a sectional view through Section 5-5 of check valve assembly 13 in FIG. 4. Check valve 13 is a check valve assembly between pumping stage 4 and pumping stage 5 and is shown as illustrative of a type of check valve assembly that may be utilized in the present invention.

Check valve assembly 13 comprises an upper hinged member 159, a middle hinged member 160, and a lower hinged member 161. Upper hinged member 159 is connected by hinges 162 and 163. Middle hinged member 160 is connected by hinges 164 and 165. Lower hinged member 161 is connected by hinges 166 and 167. Upper hinged member 159 opens and closes upper opening 168. Middle hinged member 160 opens and closes middle opening 169. Lower hinged member 161 opens and closes lower opening 170. Hinged members 159, 160, and 161 are of the "swinging door" variety for simplicity and reliability and, in the open position, a minimum of resistance is offered to the flow of water. A plurality of hinged members is utilized so that in the open position the hinged members do not extend into the pressure chamber sufficiently to interfere with the extended bladder. To insure that the hinged members 159, 160, and 161 close automatically in the absence of a pressure differential across the chamber wall, the pump body 131 may be tilted so that the output end is higher than the input end. Any number of hinged members desired may be utilized in each check valve assembly.

The input water diverting means 147 is an input liquid diverting means 147 for any liquid that may be used. The output water diverting means 148 is an output liquid diverting means 148 for any liquid that may be used.

FIG. 5 shows an example of a check valve assembly 13 which may be utilized. Any check valve assembly desirable to the user may also be utilized.

Figure 6:
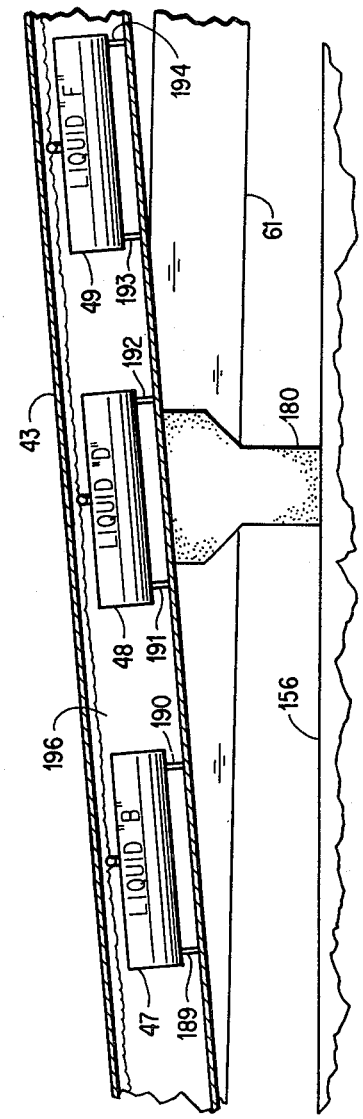
FIG. 6 is a partial sectional view at Section 6—6 of second trough 43 in FIG. 4.

FIG. 6 is a partial sectional view at Section 6—6 of second trough 43 in FIG. 4. Second trough 43 contains container 47 for liquid "B", container 48 for liquid "D", and container 49 for liquid "F". Container 47 may be supported by support members 189 and 190. Container 48 may be supported by support members 191 and 192. Container 49 may be supported by support members 193 and 194. Second trough 43 may be supported by trough support 180 which is secured to the plain or flat land 156. Second trough 43 holds water 196 which may be hot or cold depending on the cycle of the heat-powered pump system 244.

Figure 7:
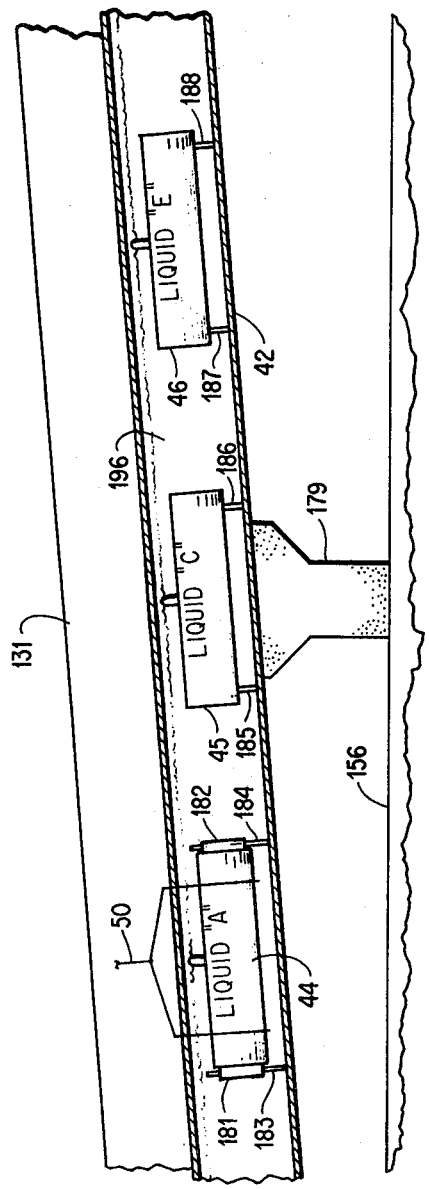
FIG. 7 is a partial sectional view at Section 7—7 of first through 42 in FIG. 4.

FIG. 7 is a partial sectional view at Section 7—7 of first trough 42 in FIG. 4. First trough 42 contains container 44 for liquid "A", container 45 for liquid "C", and container 46 for liquid "E". Container 45 for liquid "C" may be supported by support members 185 and 186. Container 46 for liquid "E" may be supported by support members 187 and 188. Container 44 for liquid "A" may be supported by support guide 181 on support rod 183 and support guide 182 on support rod 184. Cable 50 is connected onto container 44 for use with gate control means 132.

The first trough 42 and the second trough 43 are elevated to insure that the water flows downward and empties out of the first trough 42 and the second trough 43 when the gate control means 132 causes the gates to change positions. This elevation insures that when the cold water pump 68 has stopped momentarily and the gate positions are changed, the cold water will drain from the troughs prior to the application of hot water. This feature insures that there is no residual cold water which would have to be heated by the incoming hot water. First trough 42 holds water 196 which may be hot or cold depending on the cycle of the heat-powered pump system 244.

Figure 8:
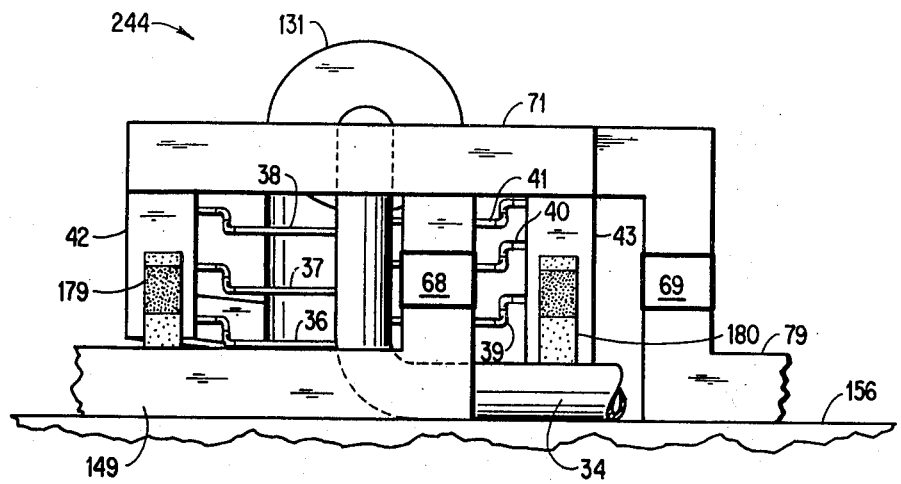
FIG. 8 is an end elevational view of the discharge end of heat-powered pump system 244.

FIG. 8 is an end elevational view of the discharge end of the heat-powered pump system 244. Connecting trough 149 connects the liquid cooling means 125 to the input water diverting means 147. Output pipe 34 carries the pressurized water 35 to the elevated storage means 126. Trough support 179 supports first trough 42. Trough support 180 supports second trough 43. Connecting trough 79 leading from liquid heating means 123 is shown carrying hot water through hot water pump 69 and into the heat-powered pump system 244. Various pipes 36, 37, 38, 39, 40, and 41 carrying various liquids are shown.

Figure 9:
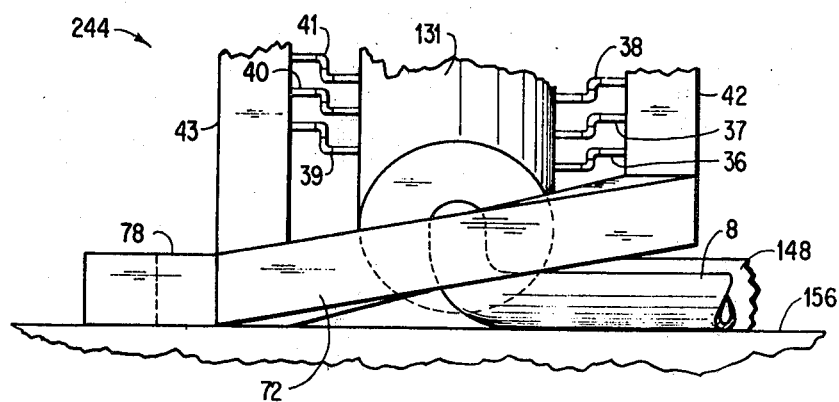
FIG. 9 is an end elevational view of the intake end of heat-powered pump system 244.

FIG. 9 is an end elevational view of the intake end of heat-powered pump system 244. Connecting trough 78 returning hot water from output water diverting means 146 to liquid heating means 123 is shown. Trough section 72 connects to first trough 42 and to outlet gate 62 (not shown). Pump body 131 connects to pipes 36, 37, 38, 39, 40, and 41 holding various vaporized liquids extending to either first trough 42 or second trough 43. Pipes 36, 37, and 38 extend to first trough 42. Pipes 39, 40, and 41 extend to second trough 43. Connecting means or pipe 8 brings water 7 from water source 127 (not shown) into the pump body 131.

Figure 10:
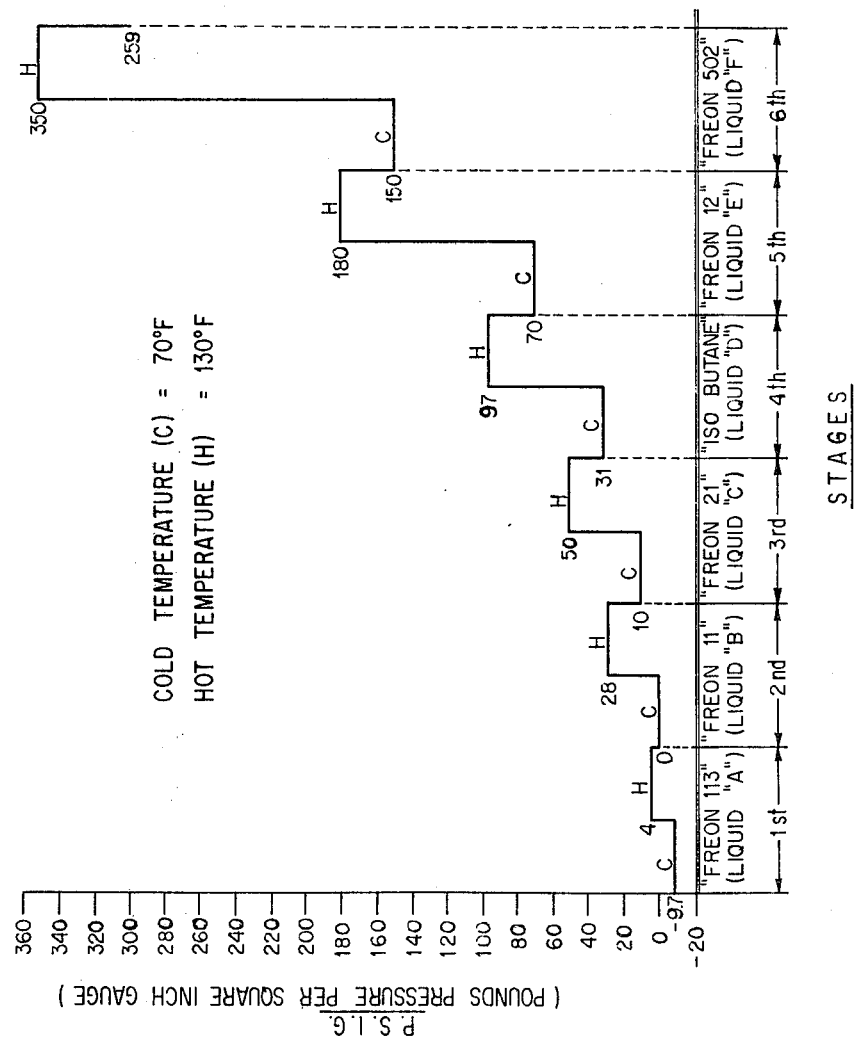
FIG. 10 is a graphic representation showing the relationship between the pounds pressure per square inch gauge and the stage utilized with a specific vaporizable liquid and temperature applied thereto for the various stages in the pumping sequence.

FIG. 10 is a graphic representation showing the relationship between the pounds pressure per square inch gauge and the stage utilized with a specific vaporizable liquid and temperature applied thereto for the various stages in the pumping sequence.

As shown previously in FIG. 2 and FIG. 4, the various pumping sections each contain a pressure chamber within which is a flexible member. Each flexible member is connected to a different liquid within a different container in one of two troughs. When the trough in which a container is placed is supplied with hot water, the liquid in the container tends to vaporize. The vapor is carried through a pipe into the flexible member. The flexible member expands as the volume of vaporized liquid increases. The flexible member may expand to such an extent as to virtually fill the pressure chamber within which it is located. The pressure, that is applied by the expanding flexible member against the liquid that is already in the pressure chamber, forces that liquid against the check valves located on each side of the pressure chamber. As the pressure within the pressure chamber is greater than the pressure in the next highest numbered pressure chamber, then the liquid within the pressure chamber will be forced through the check valve into the next highest numbered pressure chamber. As can be seen clearly in FIG. 2, the present system operates by having the flexible member deflated in one chamber, while being inflated in the next thereby pushing or pumping the liquid through the pump body 131 toward the elevated storage means 126.

As an example as seen in FIG. 2, liquids "A", "C", and "E" are in the first trough 42 and, when that trough contains cold water, the liquids are condensed and the flexible members in pumping stages 1, 3, and 5 are deflated. Liquids "B", "D", and "F" in second trough 43 have hot water which is vaporizing those liquids and causing the flexible members in pumping stages 2, 4, and 6 to be inflated. The inflated flexible member 23 in pumping stage 2 would force liquid through check valve 11 into pumping stage 3. The inflated flexible member 25 in pumping stage 4 would force liquid through check valve 13 into pumping stage 5. The inflated flexible member 27 in pumping stage 6 would force liquid through check valve 15 into pipe 34 where the pressurized water 35 will be carried to the elevated storage means 126.

In the alternative, if the cold water was removed from the first trough 42 and hot water placed in first trough 42, while at the same time the hot water was removed from second trough 43 and cold water placed therein, the flexible members in the pumping stages would be in the opposite condition. The flexible members in pumping stages 1, 3, and 5 would be inflated and would force liquid through the next check valve to the following stage. The flexible members in pumping stages 2, 4, and 6 would be deflated and those stages would be filled with liquid from the prior stages.

FIG. 10 shows a graphic representation of the relationship between the pressure produced into the various stages. FIG. 10 assumes a situation where the cold water temperature is 70° F. and the hot water temperature is 130° F. and assumes the following to be approximately accurate: at 70° F. the pounds pressure exerted by "Freon 113" vapor is −9.7 P.S.I.G.; at 130° F. the pounds pressure exerted by "Freon 113" vapor is 4 P.S.I.G.; at 70° F. the pounds pressure exerted by "Freon 11" vapor is 0 P.S.I.G.; at 130° F. the pounds pressure exerted by "Freon 11" vapor is 28 P.S.I.G.; at 70° F. the pounds pressure exerted by "Freon 21" vapor is 10 P.S.I. G.; at 130° F. the pounds pressure exerted by "Freon 21" vapor is 50 P.S.I.G.; at 70° F. the pounds pressure exerted by "iso butane" vapor is 31 P.S.I.G.; at 130° F. the pounds pressure exerted by "iso butane" is 97 P.S.I.G.; at 70° F. the pounds pressure exerted by "Freon 12" is 70 P.S.I.G.; at 130° F. the pounds pressure exerted by "Freon 12" is 180 P.S.I.G.; at 70° F. the pounds pressure exerted by "Freon 502" is 150 P.S.I.G.; and at 130° F. the pounds pressure exerted by "Freon 502" is 350 P.S.I.G. Also assumed is that the column of water in pipe 34 is approximately 600' high having a back pressure of approximately 259 P.S.I.G. Therefore, by utilizing the present system of multiple-stages with small temperature differentials, the liquid is moved from a pressure of 0 P.S.I.G. to the back pressure of the 600' column of water, 259 P.S.I.G.

The water in the last pumping stage is prevented from prematurely exiting the last check valve 15 by the back pressure of the water residing in the output pipe 34. This pressure is dependent upon the height in which the water is to be pumped. This back pressure holds the output check valve 15 closed except during the high temperature part of the cycle when the last stage using "Freon 502" develops a pressure of 350 P.S.I.G.

In FIG. 10 liquid "A" is graphically shown as being "Freon 113", liquid "B" is graphically shown as being "Freon 11", liquid "C" is graphically shown as being "Freon 21", liquid "D" is graphically shown as being "iso butane", liquid "E" is graphically shown as being "Freon 12", and liquid "F" is graphically shown as being "Freon 502".

To indicate the operation of the heat-powered pump system 244, water 7 in connecting means or pipe 8 at ground level would have a pressure of 14.7 absolute or 0 P.S.I.G. Therefore, the water source side of check valve 9 would stand at 0 P.S.I.G.

Assuming that in the beginning of the cycle cold water flows through first trough 42 and hot water flows through second trough 43, the cold water in first trough 42 would cause the vapor pressure of liquid "A" to be at −9.7 P.S.I.G. Therefore, the water 7 would flow through pipe 8 and fill pressure chamber 16. The gate control means 132 would then be activated to change the flow of hot and cold water so that hot water flowed through first trough 42 and cold water flowed through second trough 43.

The liquid "A" ("Freon 113") would then rise to a vapor pressure of 4 P.S.I.G. The flexible member 23 in pumping stage 2 would be deflated and when the system has been operating, would have a pressure of 0 P.S.I.G. The liquid within the pumping stage 1 would then be forced by the high pressure through check valve 10 into pumping stage 2. As the system continues operation, when the hot and cold water change in the troughs, the liquid will be pumped to the next highest numbered stage at a high pressure. When the water in second trough 43 is hot, liquid "B" ("Freon 11") would have a vapor pressure of 28 P.S.I.G. which would be greater than the cold vapor pressure of 10 P.S.I.G. of the liquid "C" ("Freon 21") in pumping stage 3. When the hot and cold water in the troughs are again changed, the liquid in pumping stage 3 would be subjected to a vapor pressure of 50 P.S.I.G. and would flow through check valve 12 into pumping stage 4 which has liquid "D" ("iso butane") at a cold vapor pressure of 31 P.S.I.G.

When the hot and cold water in the troughs are again changed, the liquid within pumping stage 4 would be subjected to a vapor pressure of 97 P.S.I.G. and will be forced through check valve 13 into pumping stage 5, which has liquid "E" ("Freon 12") at a cold vapor pressure of 70 P.S.I.G.

When the hot and cold water in the troughs are again changed, the liquid within pumping stage 5 will be subjected to a vapor pressure of 180 P.S.I.G. and will be forced through check valve 14 and into pumping stage 6, which has liquid "F" ("Freon 502") at a cold vapor pressure of 150 P.S.I.G.

When the hot and cold water in the troughs are changed again, the liquid within pumping stage 6 will be subjected to a vapor pressure of 350 P.S.I.G. and will be forced through check valve 15 and into pipe 34 which has a back pressure of 259 P.S.I.G.

FIG. 10 is simply illustrative of the use of the present invention for six specific liquids at one specific cold temperature and one specific hot temperature. The principles of the present invention may be utilized with any number of liquids as long as the hot vapor pressure of any given stage is greater than the cold vapor pressure of the next larger numbered stage. The preceding stage must always reach a higher pressure than the subsequent stage so that the liquid will be pushed through the check valve into the subsequent stage.

As illustrated in FIG. 2 and FIG. 4, liquids "A", "C", and "E" are in the same first trough 42 and are always simultaneously subjected to either cold or hot water. Liquids "B", "E", and "F" are also in the same second trough 43 and are always simultaneously subjected to either cold or hot water.

Figure 11:
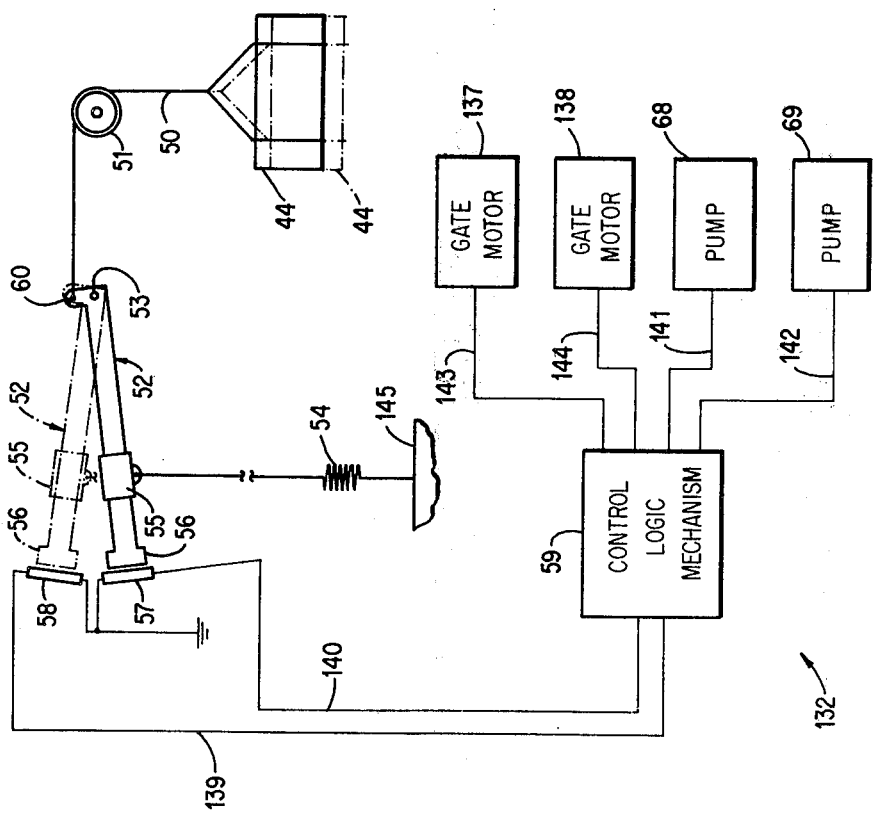
FIG. 11 is a schematic representation of gate control means 132.

FIG. 11 is a schematic representation of gate control means 132. Gate control means 132 comprises a cable 50 secured to one of the containers in first trough 42 and second trough 43. Container 44 which is in first trough 42 is illustrated as was previously shown in FIG. 7.

Cable 50 wraps around pully 51 and is anchored in rocker bar 52 at cable anchor 60. Rocker bar 52 rotates about pin 53. A spring 54 is attached to ground anchor 145 from movable bracket 55, which is movable on rocker bar 52. Movable bracket 55 is placed on rocker bar 52 in a manner that the weight of the container 44, when empty, is approximately equal the opposing force of the rocker arm mechanism together with the tension on spring 54, when spring 54 is in its contracted position. When container 44 is empty, rocker bar 52 is in the lower position shown in solid lines in FIG. 11.

Magnet 56 is adjacent to lower reed switch 57 and upper reed switch 58. Lower reed switch 57 and upper reed switch 58 are magnetic proximity switches. When the magnet 56 is positioned close to the lower reed switch 57, a signal is sent through wire 140 to control logic mechanism 59. When the magnet 56 is positioned close to the upper reed switch 58, a signal is sent through wire 139 to control logic mechanism 59.

When the vaporized liquid "A" is cooled and returned to the container 44, container 44 will increase in weight due to the condensation of the vaporized liquid "A" in container 44. The weight will pull on cable 50 through pully 51 and cable anchor 60, and rocker bar 52 will rise causing magnet 56 to be in proximity with upper reed switch 58 at the time that the container 44 is approximately full. A signal is then transmitted through wire 139 to control logic mechanism 59. Control logic mechanism 59 would then turn off cold water pump 68 and hot water pump 69 and energize gate motor 137 through wire 143 and gate motor 138 through wire 144. The gate motors would switch the gates 62 and 65 to a different position where the gates will remain until the control logic mechanism 59 again receives a signal to switch the gate positions.

After the gates are switched, the pumps are again started and cold water would be diverted through the trough which previously had held hot water, while hot water would be diverted through the trough that previously held cold water.

When the hot water causes the liquid "A" in container 44 to vaporize to such an extent that container 44 becomes light to such a point that it is virtually empty, the rocker bar 52 will be lowered so that magnet 56 is in proximity with lower reed switch 57 causing a signal to pass via wire 140 to control logic mechanism 59. The control logic mechanism 59 would then again pass signals to the gate motors and to the pumps in order to change the cycle of the pumps operation.

Wire 143 is connected between control logic mechanism 59 and gate motor 137. Wire 144 is connected between control logic mechanism 59 and gate motor 138. Wire 141 is connected between control logic mechanism 59 and cold water pump 68. Wire 142 is connected between control logic mechanism 59 and hot water pump 69.

Gate control means 132 is illustrative of one method of determining when the vaporizable liquid in a container has virtually completely vaporized or has been virtually completely condensed back within the container. Other methods of determining that condition are within the scope of the present invention and can be utilized herein.

Figure 12:
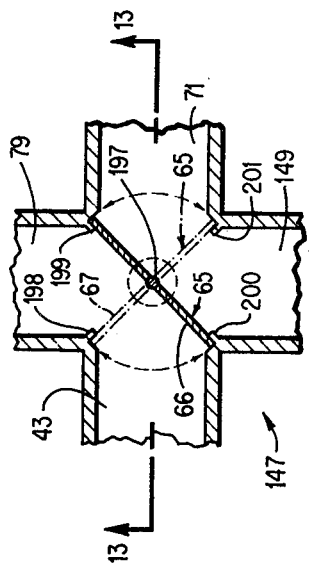
FIG. 12 is a lateral sectional view through input water diverting means 147 at inlet gate 65.

FIG. 12 is a lateral sectional view through input water diverting means 147 at inlet gate 65. Connecting trough 79 connects input water diverting means 147 with liquid heating means 123 and hot water flows therethrough. Connecting through 149 connects input water diverting means 147 to liquid cooling means 125 and cold water flows therethrough.

FIG. 12 is a sectional view at inlet gate 65. Inlet gate 62 works in similar fashion to inlet gate 65 and has been previously explained in FIG. 4.

Inlet gate 65 has a gate pivoting shaft 197 which, upon direction by the gate control means 132, changes inlet gate 65 to either position 66 or position 67. Position 66 is shown in FIG. 12 in solid lines. Position 67 is shown in FIG. 12 in broken lines.

When inlet gate 65 is in position 66, it is stopped by gate stops 199 and 200. When inlet gate 65 is in gate position 67, it is stopped by gate stops 198 and 201.

Outlet gate 62 has a gate pivoting shaft 248 which is similar to the gate pivoting shaft 197 of inlet gate 65.

Figure 13:
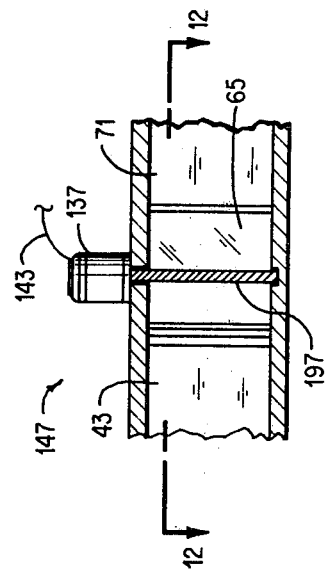
FIG. 13 is a sectional view of input water diverting means 147 taken at Section 13—13 of FIG. 12.

FIG. 13 is a sectional view of input water diverting means 147 taken at Section 13—13 of FIG. 12. Gate motor 137 is shown in position to turn gate pivot shaft 197 in order to place inlet gate 65 in either inlet position 66 or inlet position 67.

Wire 143 connects gate motor 137 to the control logic mechanism 59 of gate control means 132.

FIG. 13 indicates that FIG. 12 can also be noted as being a sectional view at Section 12—12 of FIG. 13.

Figure 14:
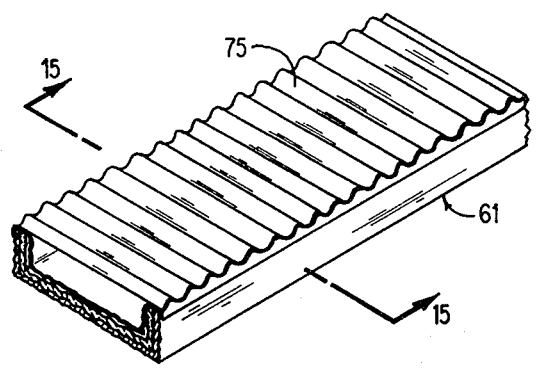
FIG. 14 is a partial isometric view of heat collector trough 61 of liquid heating means 123.

FIG. 14 is a partial isometric view of heat collector trough 61 of liquid heating means 123. Trough 61 has a top glazing 75 which is translucent to allow light to enter the trough 61.

Figure 15:
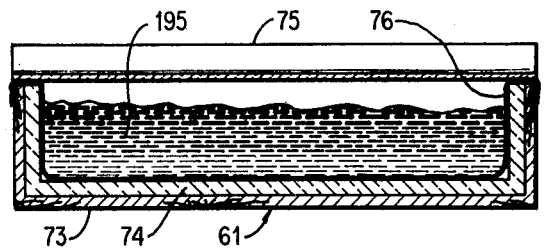
FIG. 15 is a sectional view of heat collector trough 61 of liquid heating means 123 taken at Section 15—15 of FIG. 14.

FIG. 15 is a sectional view of heat collector trough 61 of liquid heating means 123 taken at Section 15—15 of FIG. 14. Trough 61 is formed by treated wood 73 and is lined with styrofoam or other sheet-type insulation 74. The inside surface liner 76 of trough 61 which is exposed to water may be a sheet of black polyethylene, other plastic film, or some other type of lining material. The top glazing 75 may be a layer of corrugated translucent fiberglass-type glazing. Top glazing 75 provides visible light transmission and infrared blockage capabilities necessary for efficient solar heating of the water within trough 61.

Trough 61 is part of a continuous loop system where water is circulated and raised in temperature as it passes through the system. The liquid heating means 123 may be a solar heating trough, such as trough 61 which extends for any desired distance in order to heat a desired volume of water to its desired temperature. However, the liquid heating means may be any desired or desirable method utilizing any desired configuration of heating water or other liquids to be utilized in the heat-powered pump system 244. Trough 61 holds heated water 195.

Figure 16:
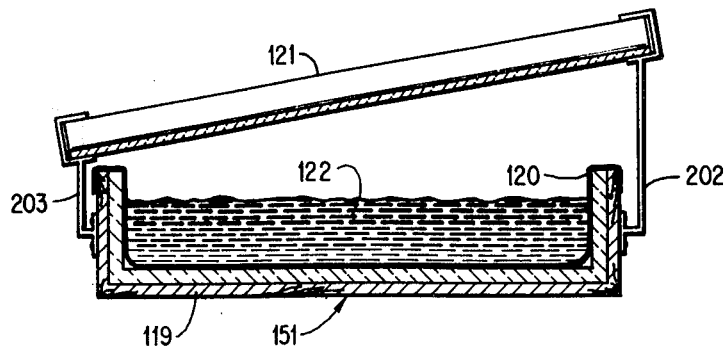
FIG. 16 is a cross-sectional view of cooling trough 151 which may be utilized as liquid cooling means 125.

FIG. 16 is a cross-sectional view of cooling trough 151 which may be utilized as liquid cooling means 125. Any convenient or inexpensive liquid cooling means desired or available may be utilized with the present invention.

FIG. 1 illustrates a river utilized as liquid cooling means 125, a source for the cold water. In areas where there is no such convenient water source, another method of cooling water may be utilized, such as evaporative trough-type cooling trough 151.

Trough 151 has a frame 119 and a lining 120 which waterproofs cooling trough 151 in the same manner that trough liner 76 waterproofed trough 61. Differing from trough 61, the insulation is not utilized between the frame 119 and the lining 120.

Water 122 flows within the cooling trough 151. Above the cooling trough 151 is a slanted roof 121 which is opaque and is designed to shield the water from the suns rays. Opaque roof 121 is supported by high support bracket 202 and lower support bracket 203. A plurality of brackets 202 and 203 may be required depending upon the total length of trough 151. Support brackets 202 and 203 are designed so that air may flow below the roof 121 to promote evaporation from water 122 in the cooling trough 151.

Many other types of cooling means may be utilized with the present invention which may be much more desirable and convenient than cooling trough 151.

Figure 17:
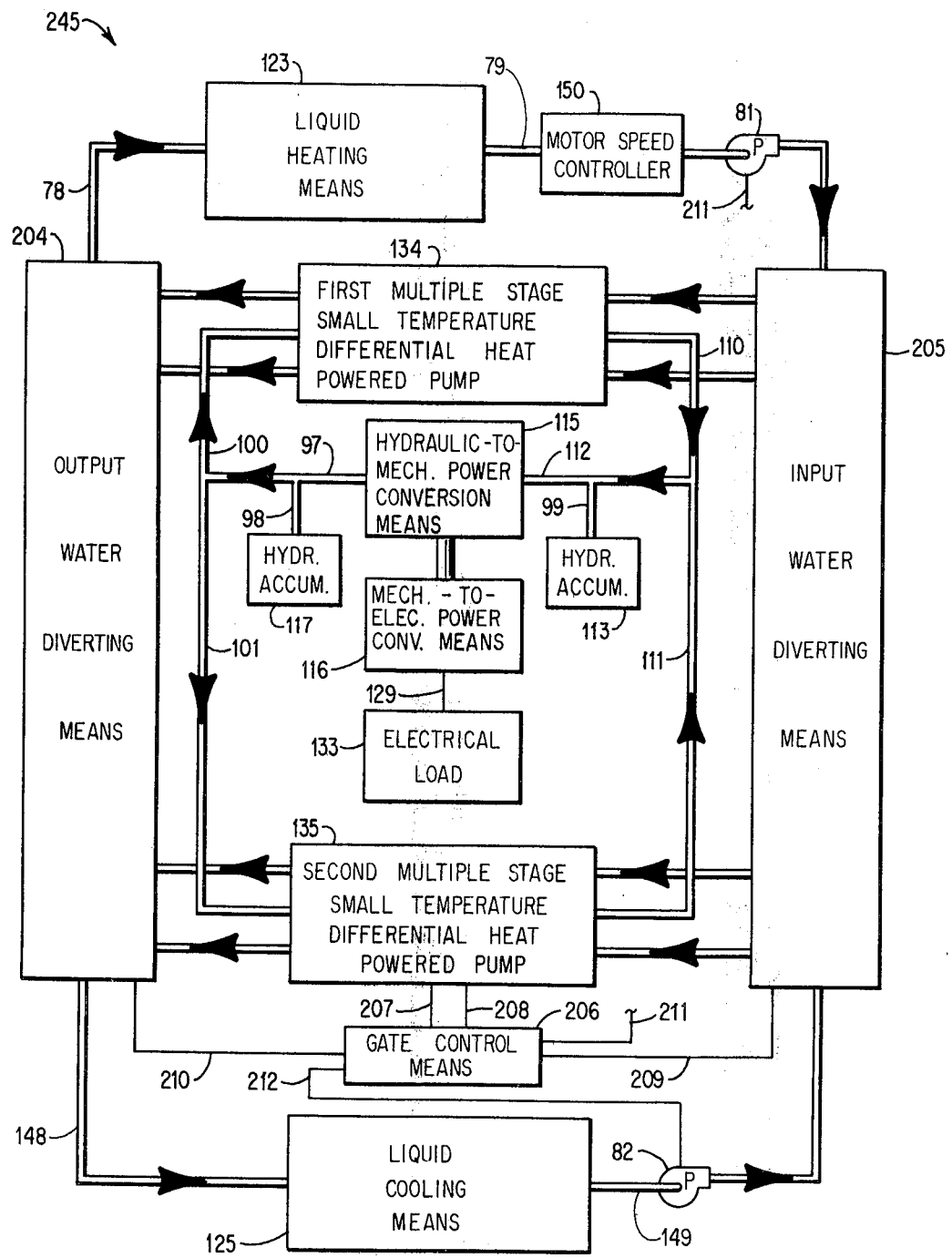
FIG. 17 is a schematic representation of heat-powered generating system 245.

FIG. 17 is a schematic representation of heat-powered generating system 245. The heat-powered generating system 245 operates on the basic principles herein utilizing small temperature differential multiple stages. These principles are utilized to form a heat-powered generating system 245.

Liquid heating means 123 provides liquid through hot water pump 81 with motor speed control 150 through connecting trough 79 to the input water diverting means 205. The input water diverting means 205 diverts the hot water to either the first multiple-stage small temperature differential heat-powered pump 134 or the second multiple-stage small temperature differential heat-powered pump 135. The hot water is then directed into the output water diverting means 204 where it is diverted to connecting trough 78 and back to the liquid heating means 123.

Liquid is cooled in the liquid cooling means 125, and then passes through cold water pump 82, and into the input water diverting means 205. The cold water passes from input water diverting means 205 into either the first multiple-stage small temperature differential heat-powered pump 134 or the second multiple-stage small temperature differential heat-powered pump 135. the cold water then passes into the output water diverting means 204. The cold water is diverted through connecting trough 148 back to the liquid cooling means 125.

The liquid heating means 123 and the liquid cooling means 125 simply provide hot and cold water to be utilized by the multiple stages within the heat-powered generating system 245. The heat-powered generating system 245 has a working water system which is primed and which theoretically will not require the addition of any further water. This is the water which passes through the first multiple-stage small temperature differential heat-powered pump 134, through connector 110, and through the second multiple-stage small temperature differential heat-powered pump 135, through connector 111, through inlet pipe 112 to the hydraulic-to-mechanical power conversion means 115. From the hydraulic-to-mechanical power conversion means 115, the water passes through outlet pipe 97 to pass back to first multiple-stage small temperature differential heat-powered pump 134 via connector 100 or to the second multiple-stage small temperature differential heat-powered pump 135 via connector 101.

A gate control means 206 is similar to gate control means 132 and may be utilized to control gates within the input water diverting means 205 and the output water diverting means 204. Control wire 209 extends from gate control means 206 to input water diverting means 205. Control wire 211 extends between gate control means 206 and hot water pump 81. Control wire 212 extends between gate control means 206 and cold water pump 82. Control wire 210 extends from gate control means 206 to output water diverting means 204. Control wires 207 and 208 extend from the second multiple-stage small temperature differential heat-powered pump 135 to the gate control means 206.

The gate control means 206 may be operated from any stage within either the first multiple-stage small temperature differential heat-powered pump 134 or the second multiple-stage small temperature differential heat-powered pump 135.

Connector 99 is connected from inlet pipe 112 to inlet hydraulic accumulator 113. Connector 98 extends from outlet pipe 97 to outlet hydraulic accumulator 117. The hydraulic-to-mechanical power conversion means 115 drives a mechanical-to-electrical power conversion means 116 which is connected by wire 129 to electrical load 133.

Figure 18:
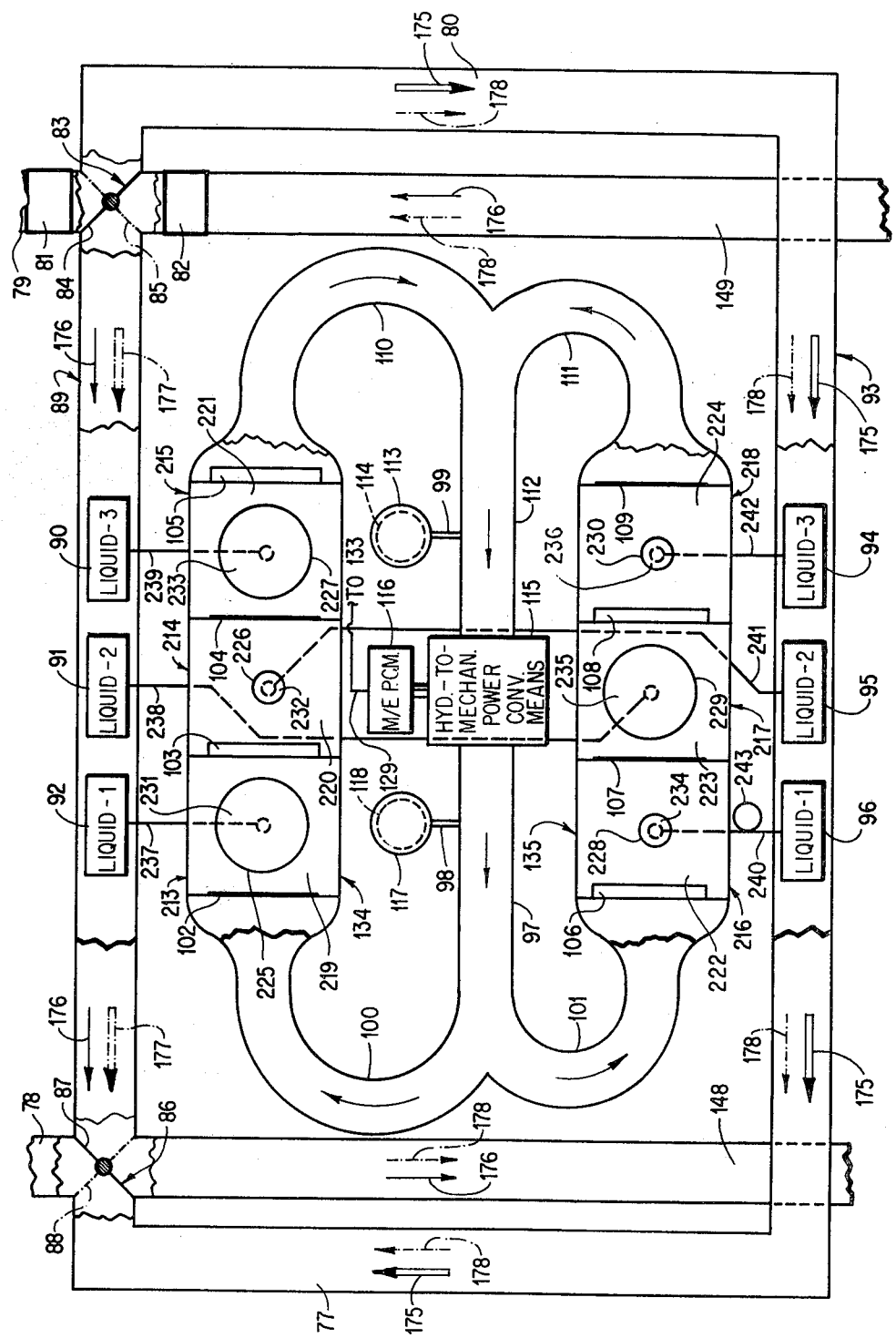
FIG. 18 is a schematically represented view of heat-powered generating system 245.

FIG. 18 is a schematically represented plan view of heat-powered generating system 245. Within heat-powered generating system 245 are pumping stages 231, 214, and 215 which form the first multiple-stage small temperature differential heat-powered pump 134, and pumping stages 216, 217, and 218 which form the second multiple-stage small temperature differential heat-powered pump 135.

Pumping stage 213 has a pressure chamber 219 within which is an expandable member 225. Pumping stage 214 has a pressure chamber 220 within which is an expandable member 226. Pumping stage 215 has a pressure chamber 221 within which is an expandable member 227. Pumping stage 216 has a pressure chamber 222 within which is an expandable member 228. Pumping stage 217 has a pressure chamber 223 within which is an expandable member 229. Pumping stage 218 has a pressure chamber 224 within which is an expandable member 230.

Expandable member 225 contains vapor 231. Expandable member 226 contains vapor 232. Expandable member 227 contains vapor 233. Expandable member 228 contains vapor 234. Expandable member 229 contains vapor 235. Expandable member 230 contains vapor 236.

Trough 89 holds container 92 for liquid 1, container 91 for liquid 2, and container 90 for liquid 3. Trough 93 holds container 96 for liquid 1, container 95 for liquid 2, and container 94 for liquid 3.

The vapor 231 in expandable member 225 passes through pipe 237 from container 92. The vapor 232 in expandable member 226 passes through pipe 241 from container 95. The vapor 233 in expandable member 227 passes through pipe 239 from container 90. The vapor 234 in expandable member 228 passes through pipe 240 from container 96. The vapor 235 in expandable member 229 passes through pipe 238 from container 91. The vapor 236 in expandable member 230 passes through pipe 242 from container 94.

Pipe 240 has a flexible portion 243 which allows utilization of a form of gate control means 206.

In the operation of the heat-powered generating system 245, cold water enters through connecting trough 149 from liquid cooling means 125. Hot water enters from liquid heating means 123 through connecting trough 79. Inlet gate 83 is similar to inlet gate 65. Inlet gate 83 has an inlet gate position 84 and an inlet gate position 85. Outlet gate 86 is similar to outlet gate 62. Outlet gate 86 has an outlet gate position 87 and an outlet gate position 88. Depending upon which position inlet gate 83 and outlet gate 86 are in, either hot water or cold water will flow into troughs 89 and 93. Whenever one of those troughs has hot water, the other will have cold water.

Arrow 175 indicates the hot water path with the gates in positions 84 and 87. Arrow 176 indicates the cold water path with the gates in positions 84 and 87. Arrow 177 indicates the hot water path with the gates in positions 85 and 88. Arrow 178 indicates the cold water path with the gates in positions 85 and 88. As shown by arrows 175 and 178, hot water and cold water may flow through trough sections 77 and 80 during their journey through troughs 89 and 93.

FIG. 18 is taken at a position in time when hot water had been flowing through trough 89 and cold water had been flowing through trough 93. Liquid 1 in container 92 has vaporized and vapor 231 has enlarged expandable member 225. Liquid 3 in container 90 has vaporized and vapor 233 has enlarged expandable member 227. Liquid 2 in container 91 has vaporized and vapor 235 has enlarged expandable member 229.

Liquid 1 in container 96 has cooled and vapor 234 has condensed reducing the size of expandable member 228. Liquid 2 in container 95 has cooled and vapor 232 has condensed reducing the size of expandable member 226. Liquid 3 in container 94 has cooled and vapor 236 has condensed reducing the size of expandable member 230.

The pressure in pressure chamber 219 expands greater than the pressure in pressure chamber 220, thereby opening check valve 103 which is between pumping stages 213 and 214. The pressure in pumping stage 214 does not exceed the pressure within pumping stage 215, therefore, check valve 104 between pumping stages 214 and 215 remains closed. The pressure in pumping stage 215 exceeds the pressure in container 110, thereby opening check valve 105 which is between pumping stage 215 and connector 110. Water then flows through connector 110 and through inlet pipe 112 to the hydraulic-to-mechanical power conversion means 115. From the hydraulic-to-mechanical power conversion means 115, the water flows through outlet pipe 97 and towards pumping stage 216 which has a lower pressure, thereby, the pressure from the oncoming water is greater than the lower pressure within the pumping stage 216. Therefore, this opens the check valve 106 between connector 101 and pumping stage 216. The pressure within pumping stage 216 is less than the pressure within pumping stage 217, thereby check valve 107 which is between pumping stages 216 and 217 does not open. The pressure within pumping stage 217 is greater than the pressure within pumping stage 218, thereby check valve 108 which is between pumping stages 217 and 218 is open, allowing the liquid to flow from pumping stage 217 into pumping stage 218. The pressure in pumping stage 218 is less than the water pressure within connector 111, thereby the check valve 109 which is between pumping stage 218 and connector 111 is closed.

When expandable member 228 has contracted to its desired smallest amount, the gate control means 206 will automatically cause the gates to switch to positions 85 and 88. This switch in gate positions will cause hot water to flow through trough 93 and cold water to flow through trough 89. This change in temperature will cause the expanded expandable members to contract and the contracted expandable members to expand. This causes the check valve 105 to close and check valve 109 to open allowing for continuous flow of water through connector 111 to inlet pipe 112 and utilizes the water that was stored within pumping stage 218 while the water that was previously stored within pumping stage 215 was being pumped through inlet connector 110 through inlet pipe 112.

During the transition period when the heat exchangers or containers 90, 91, 92, 94, 95, and 96 are changing in temperature, the input to the hydraulic-to-mechanical power conversion means 115 could momentarily drop. To smooth out pressure fluctuation at the input and the output of the turbine or hydraulic-to-mechanical power conversion means 115, hydraulic accumulator 113 and hydraulic accumulator 117 are utilized. These accumulators 113 and 117 may be tanks filled with compressed gas and a rubber bladder filled with water in communication with pipe 112. The accumulators 113 and 117 significantly reduce any momentary pressure drop and, thereby, reduce the possibility of speed fluctuations in the hydraulic-to-mechanical power conversion means 115. Other methods of reducing the momentary pressure drop or reducing speed variations may be used, if desired. The accumulator 113 acts to smooth the inlet pressure to the turbine or hydraulic-to-mechanical power conversion means 115. The accumulator 117 acts to smooth out the back pressure presented to the turbine or hydraulic-to-mechanical power conversion means 115. Inlet hydraulic accumulator 113 has a flexible member 114. Outlet hydraulic accumulator 117 has a flexible member 118.

Very briefly, the heat-powered generating system 245 provides a steady flow of water to the turbine or hydraulic-to-mechanical power conversion means 115 by providing a burst of water from the first multiple-stage small temperature differential heat-powered pump 134, followed by a burst from the second multiple-stage small temperature differential heat-powered pump 135, followed by a burst from the first multiple-stage small temperature differential heat-powered pump 134, followed by a burst from the second multiple-stage small temperature differential heat-powered pump 135, and so forth. Extending from turbine 115 is a mechanical-to-electrical power conversion means 116 which is connected to an electrical load 133 via connecting wire 129.

Figure 19:
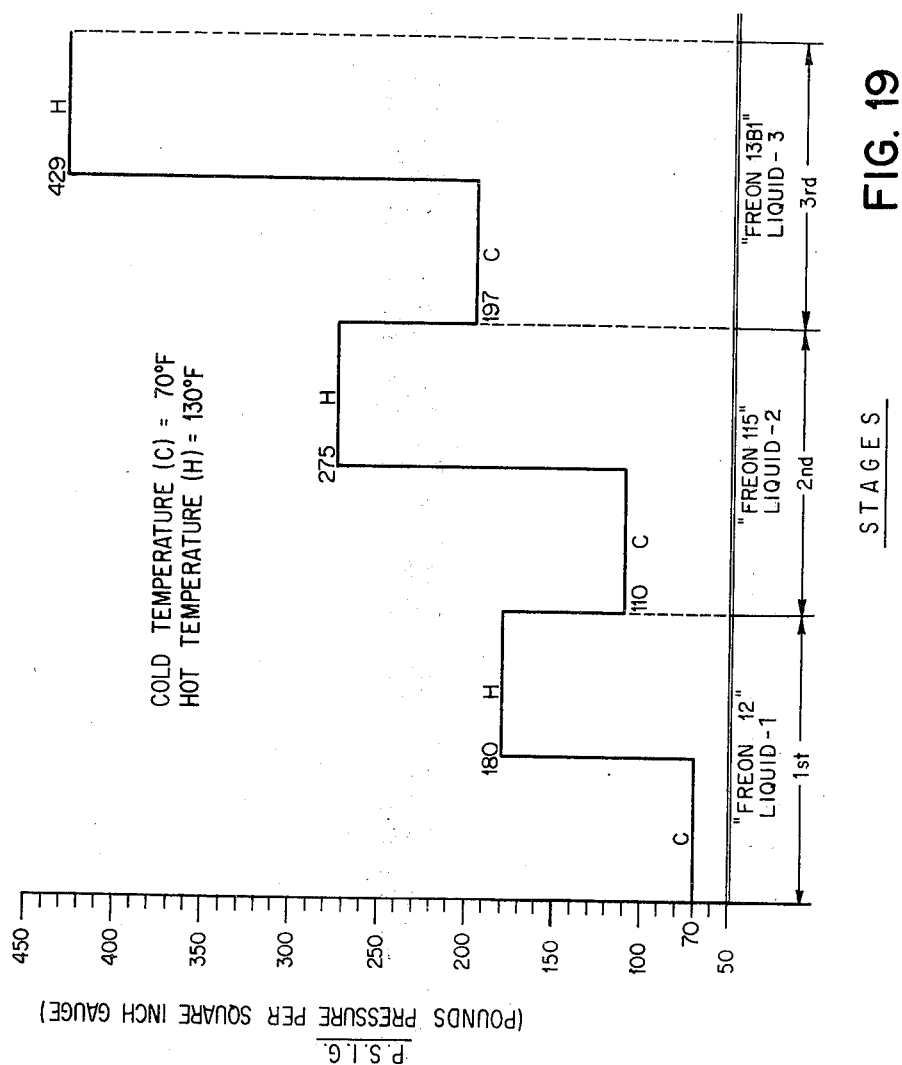
FIG. 19 is a graphic representation showing the relationship between the pounds pressure per square inch gauge and the stage utilized with the specific vaporizable liquid and temperature applied thereto for various stages in the pumping sequences within the heat-powered generating system 245.

FIG. 19 is a graphical representation showing the relationship between the pounds pressure per square inch gauge and the stage utilized with the specific vaporizable liquid and temperature applied thereto for various stages in the pumping sequences within the heat-powered generating system 245.

FIG. 19 is illustrative of either the first multiple-stage small temperature differential heat-powered pump 134 or the second multiple-stage small temperature differential heat-powered pump 135. However, remember that when the hot water flows through one of the troughs 89 or 93, that cold water flows through the other trough, thereby causing the opposite condition in the various similar stages.

For the purposes of FIG. 19, the cold water temperature is assumed to be 70° F. and the hot water temperature is assumed to be 130° F.

For example, utilizing liquid 1 as "Freon 12" when pumping stage 213 is at the hot vapor pressure of 180 P.S.I.G., the pumping stage 216 will be at the cold vapor pressure of 70 P.S.I.G. Utilizing "Freon 115" as liquid 2, when the pumping stage 214 is at the cold vapor pressure of 110 P.S.I.G., the pumping stage 217 would be at the hot vapor pressure of 275 P.S.I.G. Utilizing "Freon 13B1" as liquid 3, when the pumping stage 215 is at the hot vapor pressure of 429 P.S.I.G., the pumping stage 218 would be at the cold vapor pressure of 197 P.S.I.G.

The principles of these pumping stages are the same principles as previously illustrated and discussed in FIG. 10. A key fact of importance is that the hot vapor pressure of a stage must exceed the cold vapor pressure of the next stage in order to obtain flow through the check valves between the stages.

Since the back pressure to the hydraulic-to-mechanical power conversion means 115 is equal to the input pressure on either pumping stage 213 or pumping stage 216, whichever has an open check valve and the lower pressure, then the back pressure of the turbine or hydraulic-to-mechanical power conversion means 115 would be equal approximately to 70 P.S.I.G. The turbine 115 has an input pressure of approximately 429 P.S.I.G. and, therefore, would have a pressure head of approximately 359 P.S.I.G. Many other liquids may be utilized in the same or a different plurality of stages which are of similar nature and which conform to the criteria of the present invention.

FIG. 20 is a sectional view of check valve 13 at Section 20—20 of FIG. 5. Upper hinged member 159 opens and closes upper opening 168. Middle hinged member 160 opens and closes middle opening 169. Lower hinged member 161 opens and closes lower opening 170.

Check valves 102, 103, 104, 105, 106, 107, 108, and 109 are utilized in the heat-powered generating system 245 and may be of similar nature to the check valve 113 and other check valves within pump body 131 and are utilized in the same way. A plurality of hinged members may be utilized along with any other desired type of check valves to satisfy the desire of the user.

Each of the containers holding the various liquids is actually a heat exchanger which can be tailored in size for each pumping stage in a manner that each of the flexible members within the various pumping stages will be properly enlarged or contracted at the proper time for the cycle to change with the maximum efficiency and utilization of the pressure differentials. The system is designed to be in synchronization. The bladders which are filling with vapor reach their maximum at the same time that the bladders that are contracting reach their minimum. Each of the containers may be designed as a heat exchanger to be of such size and to retain such qualities as a liquid-to-liquid heat exchanger so as to aid in the synchronization of the entire system.

In both the pump system and the generating system, the systems can operate from any two sources of hot and cold water. Any desired source of hot and cold water can be used. A solar collector of any force can be utilized. A solar pond could be utilized under the proper circumstances.

Each different vaporizable liquid has a different vapor pressure versus temperature relationship. By selecting the correct vaporizable liquid for the heat exchangers or containers of each stage, the hydraulic pressure caused by the heat exchanger being at the high temperature for a given even-numbered stage can be made higher than the hydraulic pressure in the subsequent odd-numbered stage when its heat exchanger is at the low temperature. Water will flow from any even-numbered stage to the next odd-numbered stage even though the odd-numbered stage contains a vaporizable liquid with a higher vapor pressure for a given temperature.

The first liquid, which may be water, is incrementally elevated in pressure stage-by-stage to the pressure of the last stage and then it exits the multiple-stage small temperature differential heat-powered pump. The plurality of pump stages has the capability of utilizing the small temperature differential heat source to pump a liquid greatly beyond the vapor pressure differential of a single vaporizable liquid. The output pressure of the multiple-stage small temperature differential heat-powered pump is limited only by the high temperature vapor pressure of the vaporizable liquid used in the last stage allowing its application for very high pressure requirements.

The present invention may be utilized for pumping water from a stream or other surface source to an elevated location suitable for storage of water. The stored water would then descend through a pipe and power a conventional hydraulic turbine electric generator combination for commercial electric power production. The stored water may be utilized to power the turbine a night and during intervals of low solar flux if solar energy were the source of heating the hot liquid for the system. The elevated location may be a reservoir and the reservoir output may be used for irrigation purposes or for hydro-electric power.

The containers may be heat exchangers of the liquid-to-liquid variety. The purpose of the heat exchangers is to transfer heat from the liquid in the trough to the liquid within the container and vice versa. The amount of liquid within the container and the container is designed so that when vaporized, enough gas is generated to inflate the flexible member to nearly the size of the pressure chamber in the pumping stage. The present invention enables generation of significant mechanical power from small temperature differentials and can be utilized to take advantage of energy from solar collectors. This invention provides a heat operated pump which can achieve high output pressure pumping capacity. This invention is capable of easily converting large amounts of low temperature differential thermal energy into hydraulic horsepower which can then be utilized to power a hydraulic turbine electric generator combination. The systems herein can offer a practical method of converting solar energy into cheap electrical power and do much to make solar energy a practical alternative to fossil fuels.

The pump system may pump fluids which include liquids or gases. The heating means may utilize fluids which may be liquids or gases. The cooling means may utilize fluids which may be liquids or gases. Any combination of liquids or gases may be utilized for the fluid pumped or the fluid used in the heating means or the fluid used in the cooling means.

When the pump system is pumping a gas, the system may be used as a small temperature differential heat-powered compressor. The compressed gas can be used to run a motor or used for any other desired purpose.

The pump system may compress refrigeration-type gas. The pump can be used as the compressor in a heat pump. After compression, the condensation and evaporation of the gas may be used as heating and cooling means. The heat pump for cooling or heating may utilize the condensation or evaporation of the gas for heating and cooling means rather than a mechanical or electrical input to a mechanical compressor. The refrigeration gas does not condense within the pressure chamber of the pump since the heat generated through compression is retained by the gas. The sides of the pressure chamber may also be thermal insulators.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A pump system for pumping a first fluid from a source to an output facility comprising:
   a. a multiple-stage pump comprising:
      (1) a plurality of pumping stages; and
      (2) a plurality of check valves, one of said plurality of check valves being located on the input and output of said multiple-stage pump and between each of said plurality of pumping stages;
   b. each of said plurality of pumping stages comprising:
      (1) a pressure chamber operable to hold said first fluid; and
      (2) a flexible member within said pressure chamber operable, when expanded, to exert pressure against said first fluid and to force said first fluid from said pressure chamber through the one of said plurality of check valves between said pressure chamber and the next pressure chamber of the next subsequent pumping stage of said plurality of pumping stages or said output, if said pressure chamber is within the last of said plurality of pumping stages, when said pressure within said pressure chamber exceeds the next pressure in said next pressure chamber or said output;
   c. each of said flexible members, connected to a container which is one of a plurality of containers; and
   d. a plurality of vaporizable fluids, one of said plurality of vaporizable fluids contained within each one of said plurality of containers,
   whereby each said container holds one of said plurality of vaporizable fluids and when said container is subjected to a hot temperature, said one of said plurality of vaporizable fluids vaporizes causing said flexible member to expand and when said container is subjected to a cold temperature, said one of said plurality of vaporizable fluids condenses causing said flexible member to contract,
   wherein each said one of said plurality of vaporizable fluids which vaporizes into said flexible member has a higher pressure, when heated to said hot temperature, than the cold pressure of the next said one of said plurality of vaporizable fluids which vaporizes into the next flexible member within said next pressure chamber or to said output, if said flexible member is within said last of said plurality of pumping stages,
   wherein connected to said plurality of pumping stages are a first heat exchanger and a second heat exchanger which utilize a hot fluid to provide said hot temperature and a cold fluid to provide said cold temperature.

2. A pump system according to claim 1 further comprising temperature alternating means operative to change the temperature to which each said container is subjected from said hot temperature to said cold temperature and from said cold temperature to said hot temperature, simultaneously so that the one of said plurality of vaporizable fluids which determines the state of each said flexible member within said pressure chamber of each of said plurality of pumping stages will be at a different temperature than the one of said plurality of vaporizable fluids which determines the state of the next said flexible member within the next subsequent said pressure chamber of said plurality of pumping stages.

3. A pump system according to claim 1 wherein said first heat exchanger is operative to provide said hot temperature and said cold temperature to each of said plurality of containers which have said plurality of vaporizable fluids determining the state of each said flexible member in every odd-numbered stage of said plurality of pumping stages.

4. A pump system according to claim 3 wherein said second heat exchanger is operative to provide said hot temperature and said cold temperature to each of said plurality of containers which have said plurality of vaporizable fluids determining the state of each said flexible member in every even-numbered stage of said plurality of pumping stages.

5. A pump system according to claim 4 further comprising temperature alternating means operative to change the temperature to which each said container is subjected from said hot temperature to said cold temperature and from said cold temperature to said hot temperature, simultaneously so that the one of said plurality of vaporizable fluids which determines the state of each said flexible member within said pressure chamber of each of said plurality of pumping stages will be at a different temperature than the one of said plurality of vaporizable fluids which determines the state of the next said flexible member within the next subsequent said pressure chamber of said plurality of pumping stages.

6. A pump system according to claim 4 wherein said first heat exchanger and said second heat exchanger utilize solar energy to provide said hot temperature.

7. A pump system according to claim 1 wherein said hot fluid is hot water and said cold fluid is cold water.

* * * * *